US012496934B2

(12) United States Patent
Ciupinski et al.

(10) Patent No.: US 12,496,934 B2
(45) Date of Patent: Dec. 16, 2025

(54) FLEXIBLE MULTI-WIRE POWER SUPPLY CABLE WITH LINEAR CURRENT RECEPTION

(71) Applicant: Irid Sp. z o.o., Warsaw (PL)

(72) Inventors: Jakub Ciupinski, Lomianki Dolne (PL); Grzegorz Ciupinski, Pruszkow (PL); Andrzej Habryn, Wolbrom (PL); Maciej Ciupinski, Lomianki Dolne (PL)

(73) Assignee: Irid Sp. z o.o., Warsaw (PL)

( * ) Notice: Subject to any disclaimer, the term of this patent is extended or adjusted under 35 U.S.C. 154(b) by 830 days.

(21) Appl. No.: 17/783,285

(22) PCT Filed: Dec. 8, 2020

(86) PCT No.: PCT/IB2020/061626

§ 371 (c)(1),
(2) Date: Jun. 8, 2022

(87) PCT Pub. No.: WO2021/116900

PCT Pub. Date: Jun. 17, 2021

(65) Prior Publication Data

US 2023/0019852 A1 Jan. 19, 2023

(30) Foreign Application Priority Data

Dec. 9, 2019 (PL) ........................................ 432150

(51) Int. Cl.
*B60M 1/04* (2006.01)

(52) U.S. Cl.
CPC .................................... *B60M 1/04* (2013.01)

(58) Field of Classification Search
CPC ................................. B60M 1/00; B60M 1/04
(Continued)

(56) References Cited

U.S. PATENT DOCUMENTS

| | | | |
|---|---|---|---|
| 4,050,555 | A | 9/1977 | Ross, Jr. |
| 4,598,180 | A | 7/1986 | Seddon et al. |
| 2017/0217333 | A1 | 8/2017 | Maicr |

FOREIGN PATENT DOCUMENTS

| | | |
|---|---|---|
| CN | 1533933 | 10/2004 |
| CN | 203805721 | 9/2014 |

(Continued)

OTHER PUBLICATIONS

Translation of DE 299 09 467 U1 (Oct. 5, 2000) (Year: 2000).*
(Continued)

*Primary Examiner* — Tremesha W Burns

(57) ABSTRACT

A flexible multi-wire power supply cable with linear current reception, provided with a flexible screen (1) made of an elastomer with properties typical for an electric insulator and with at least two conductor wires (2) made of electric conductor, preferably a flexible conductor, characterised in that the conductor wires (2) are partially, that is, at parts of the circumference of the cross-section, moulded inside the flexible screen (1), with an inner separating strip (3) comprising an integral part of the flexible screen (1) between them, the outer surface of which transitions into symmetrical screen strips (4), which together with the inner separating strip (3) form guiding grooves (5) open at the bottom, providing space for uninsulated parts of conductor wires (2).

16 Claims, 6 Drawing Sheets

(58) Field of Classification Search
USPC .......................................................... 174/68.1
See application file for complete search history.

(56) References Cited

FOREIGN PATENT DOCUMENTS

| | | |
|---|---|---|
| DE | 925300 | 3/1955 |
| DE | 29920056 | 2/2000 |
| DE | 29909467 | 10/2000 |
| EP | 2700533 | 2/2014 |
| JP | 56-038523 | 4/1981 |
| PL | 240216 | 2/2022 |

OTHER PUBLICATIONS

Decyzja Pozsytywna [Decision to Grant a Patent] Dated Nov. 12, 2021 From the Urzad Patentowy Rzeczypospolitej Polskiej [Patent Office of the Republic of Poland] Re. Application No. P.432150. (2 Pages).
International Search Report and the Written Opinion Dated Apr. 12, 2021 From the International Searching Authority Re. application No. PCT/IB2020/061626. (16 Pages).
Stanie Techniki [Search Report] Dated Feb. 15, 2021 From the Urzad Patentowy Rzeczypospolitej Polskiej [Patent Office of the Republic of Poland] Re. Application No. P.432150. (1 Pagc).

* cited by examiner

FLEXIBLE MULTI-WIRE POWER SUPPLY CABLE WITH LINEAR CURRENT RECEPTION

RELATED APPLICATIONS

This application is a National Phase of PCT Patent Application No. PCT/IB2020/061626 having International filing date of Dec. 8, 2020, which claims the benefit of priority Polish Patent Application No. PL432150 filed on Dec. 9, 2019. The contents of the above applications are all incorporated by reference as if fully set forth herein in their entirety.

FIELD AND BACKGROUND OF THE INVENTION

The subject of the invention is a flexible multi-wire power supply cable with linear current reception, which guarantees safe contact power supply of mobile electric receivers moving along designated routes, for example, buses (trolley buses), suspended and cable transport carriages, loaders in mines, automatic systems for crop handling and harvest in agriculture, self-propelled cranes, gantry cranes, transport carriages, etc., also under field conditions and in temporary use, for example, at construction sites or on agricultural fields and in orchards.

The commonly used system of contact-based, wired power supply for vehicles, such as tramways, railway engines, trolley buses, metro usually takes place using top, uninsulated power lines, from which power is drawn using pantographs, inclined pantographs or, particularly in the case of trolley buses, using pantographs with contact shoes. Metro systems commonly use the so-called third rail as their power supply. Power supply provided by rigid conductors preceded power supply using flexible power supply lines. Metal pipes with a ca. 20-25 cm diameter, with a slit provided at their bottom, were one of the early forms of overhead power supply systems. The moving vehicle pulled a core moving inside the pipes, to which the vehicle was connected via a flexible cable. A two-pole power supply system provided by two parallel pipes was usually used. The pipes were attached to carrier ropes. The system was developed by Siemens and presented for the first time during the International Exposition of Electricity in Paris, in 1881. Rigid conductors were used for the first time within a national railway network in the city centre line Baltimore Belt Line of Baltimore & Ohio Railroad (USA) and was used for a short period of time following electrification in 1895. A Z-shaped metal profile was used as the traction cable, and the engines were provided with special receivers (followed by introduction of the so-called "third rail"). Power supply provided from the overhead lines had to be rather complicated initially, e.g. the system by Charles J. Van Depoele, in which electricity was collected using a trolley encompassing the line with its side rollers (American patent publication U.S. Pat. No. 336,453). Despite the fact that such receivers were quickly replaced by newer and more effective designs, they were the origin of one of two American names for tramways—the trolley.

Power supply from overhead lines became much more simple after the discovery of a trolley pole (Frank J. Sprague, used within the tramway line Franklin Street Railway in Richmond, 1888) and a contact pole, e.g. an inclined pole (Bugelstromabnehmer, Werner von Siemens, ca. 1890). A pole with a contact did not have to look like a lyre, it could also be rectangular (e.g. used within the Stockholm—Djursholm line, in three-phase lines—a design with additional frames, they were also used until recently in tramways in Rome). The trolley pole and the contact pole technology were related through a common idea—the contact between the pole and the driving line was to be realized thanks to the flexible design of the pole itself. As we have already mentioned, however, both technologies required different types of overhead lines. The invention of a pantograph, dating back to the early 20th century, seemingly had no significant influence on the shape of the overhead lines adapted to contact poles.

Before it was used within trolleybus lines, the two-pole power supply (two overhead lines) was used in some tramway networks, if the city did not approve power supply rails for the purpose, e.g. In Tokyo, Cincinnati, Havana (two-pole power supply systems). One of the variants included power supply without the so-called "zero" line, e.g. used in the Tábor—Bechyně railway line in Czechia (Frantšek Křižík): with one line operating at +700 V, the other at −700 V.

There are known solutions improving power supply safety of overhead lines and providing the option of using three phase power supply without unnecessary complications to the configuration of the power supply system. For example, the Chinese patent application CN1283493C uses rigid dielectric overhead line screens covering the line on three sides, where a special pole enables three phase supply to be realized using four cables. German patent applications and utility models DE202014102489U1, DE202014102490U1, DE102014107468A1, DE102014107466A, DE202016104836U1 disclose various designs of rigid power lines comprising semi-closed troughs in the form of a rectangular provile pipes, with one side cut along the longitudinal axis of the busbar, or a system of such troughs made of a dielectric material or a metal coated with a dielectric material, with rigid busbars placed inside such troughs, in various layouts.

A German utility model application published as DE925300 discloses electrical line with current collection. The electrical line with current collection is enclosed by a casing with a movable opening for the current collector, characterized in that the line is in the usual design and arrangement, for instance catenary, bus bar, conductor rail or laid and the envelope is designed as an elastic, longitudinally slotted tube.

U.S. Pat. No. 4,050,555A describes a trolley rail assembly. In particular an extruded plastic housing of indefinite length is disclosed, which contains an electrical conductor bar in a slot extending lengthwise of the housing. The bar is retained in the slot by a pair of ribs integral with the side walls of the slot and extending lengthwise thereof and projecting toward each other. The width of the bar is greater than the space between the ribs, but the housing is so formed that in assembling it and the bar the distance between the ribs can be increased temporarily by pressure of the bar against them to permit it to be moved rearwardly past the ribs, whereby the bar can be inserted from the front or outer side of the slot, thus permitting the use of a single conductor bar regardless of the number of housing units that may be disposed end to end to form the housing.

Japanese utility model application published as JPS5638523U discloses an insulated trolley wire, comprising a conductor for feeding a trolley carriage over the entire length of an elongated body made of an insulator. In particular a conductor for supplying power to one trolley carriage is disclosed, which is provided over the entire length of an elongated main body comprising an insulator, and a rail protruding piece for running a running section of a trolley car. An insulating trolley wire is formed by projecting outwardly over the entire length at upper and lower middle positions on both side surfaces of the main body.

U.S. Pat. No. 4,598,180A relates to overhead electric traction systems. In an overhead electric traction system according to this publication, an overhead contact wire is enclosed throughout its length within an elongate protective cover of resilient electrically insulating material. The cover is secured to the contact wire, is symmetrical about a longitudinally extending vertical plane passing through the axis of the contact wire and includes a pair of transversely extending base walls which underlie and are spaced from the contact wire and abut in the vertical plane. When engaged by a transversely extending elongate current collector carried by a travelling vehicle, the base walls are deflected upwardly and outwardly away from one another to expose the running surface of the contact wire and permit the current collector to effect electrical contact with and collect current from the contact wire; after passage of the current collector, the base walls return to their original undeflected positions so that the contact wire is again enclosed within the cover.

A German utility model application published as DE29920056U1 relates to a bus bar for 230 Volt current. The bus bar according to this disclosure provides the conductor which is accessible in an elongated plastic profile by two on one side open slots intended in particular lights, held at the rail, characterized by the fact for the electrical connection by electrical consumers, are that lasting in the plastic profile in its longitudinal direction running one or more bendable profiles made of metal are assigned and/or applicable.

A German utility model application published as DE29909467U1 relates to a bus bar. The bus bar has an insulation profile and several electrical conductors arranged inside the insulation profile, each accessible via a longitudinal slot, and with an adapter with two arms to be attached to the insulation profile, which enclose the insulation profile in the form of pliers, and with contact blades which are arranged on the arms and which each engage in one of the slots, characterized in that the insulation profile has a lens-shaped cross section and that the arms of the adapter are articulated to one another in the vicinity of an edge of the insulating profile and can be locked to one another in the vicinity of the other edge of the insulating profile.

All these systems foresee the use of uninsulated, stretched cables or rigid structures, which require appropriate bearing infrastructure to be used, and for safety reasons, imply the use of low voltages (for example, trolleybus power systems commonly use voltages such as 600V or 750V), which result in increased losses and investment costs (large cable cross-sections). The use of three phase power supply systems with significantly lower losses on transformation and simplifying the vehicle installation structure is also very difficult.

SUMMARY OF THE INVENTION

Demand for new, flexible power cables ensuring adequate insulation, which could be use in contact-type power supply systems for vehicles, such as tramways, railway engines, trolleybuses, metro vehicles, suspended and line transport carriages still exists in the field, also in field conditions and in temporary use scenarios.

Thus, the objective of this invention was to develop a design for a flexible, multi-wire power supply cable with linear power reception, ensuring insulation, for use in contact-type power supply systems of all kinds of vehicles.

Thus, the objective of this invention includes a flexible multi-wire power supply cable with linear current reception, provided with a flexible screen made of an elastomer with properties typical for an electric insulator, preferably flexible, characterised in that the wires are partially conducting, that is, at parts of the circumference of the cross-section are moulded inside a flexible screen, with an inner separating strip comprising an integral part of the flexible screen between them, the outer surface of which transitions into symmetrical screen strips, which together with the inner separating strip form guiding grooves open at the bottom, providing space for uninsulated parts of conductor wires, characterised in that the screen strips have edges of its cross-section longer than the height of the separating strip, and with said edges are touching without being fixed, along the longitudinal axis of the cable, thus creating a pocket insulating the conductor wires.

The flexible electric conductor used to make the conductor wires is preferably in the form of a twisted rope made of many small wires, preferably covered by a conductor tape.

A carrier rope made of steel or of other metals or of polymer fibres or of a mixture thereof with metals or of natural fibres or of a mixture thereof with polymer fibres is preferably moulded inside the flexible screen, above the conductor wires.

A carrier strip made of steel tapes or of other metals or of polymer tapes or of a mixture thereof with metal tapes or of natural fibres or of a mixture thereof with polymer fibres is preferably moulded inside the flexible screen, above the conductor wires.

Non-through depressions are preferably provided in the bottom surface of the flexible screen, along the longitudinal axis of the cable, placed evenly or unevenly, wherein the distance between such depression is preferably in the range between 5 and 300 mm.

Non-through depressions are preferably provided in the top surface of the flexible screen, along the longitudinal axis of the cable, placed evenly or unevenly, wherein the distance between such depression is preferably in the range between 5 and 300 mm.

The conductor wires are preferably formed as a conductor tape bundle.

The flexible screen is preferably provided in its top part with a fixing strip, the width of the top base B of which is equal to or greater than the width of the bottom base b of the strip.

A carrier rope made of steel or of other metals or of polymer fibres or of a mixture thereof with metals or of natural fibres or of a mixture thereof with polymer fibres is preferably moulded inside the fixing strip of the flexible screen.

The flexible screen is preferably provided with a fixing strip in its top part, with openings provided in the strip, in surfaces lateral to the longitudinal axis of the cable, with the opening formed as through or non-through openings.

Through openings are preferably provided in the flexible screen, between the top and the bottom surfaces, at equal or different distances from each other.

The surface area of the cross-section of through opening is preferably larger on the side of the bottom surface than on the side of the top surface.

A toothed comb structure is preferably provided in the top part of the flexible screen, along the longitudinal axis of the cable.

Another subject of the present invention is a flexible multi-wire power supply cable with linear current reception, provided with a flexible screen made of an elastomer with properties typical for an electric insulator and with at least two conductor wires made of electric conductor, preferably a flexible conductor, the conductor wires are partially, that is, at parts of the circumference of the cross-section, moulded inside the flexible screen, with an inner separating strip comprising an integral part of the flexible screen between them, the outer surface of which transitions into symmetrical screen strips, which together with the inner separating strip form guiding grooves open at the bottom, providing space for uninsulated parts of conductor wires, characterised in that that the separating strip is split along the longitudinal axis into at least two inner screen strips touching at the edges of the outer screen strips without being fixed, along the longitudinal axis of the cable, forming two pockets insulating the conductor wires, wherein the outer screen strips swing outwards thus forming outwardly directed pockets to isolate the conductor wires to ensure a side access for the conductor wires.

Another subject of the present invention is a flexible multi-wire power supply cable with linear current reception provided with a flexible screen made of an elastomer with properties typical for an electric insulator and with at least two conductor wires made of electric conductor, preferably a flexible conductor, the conductor wires are partially, that is, at parts of the circumference of the cross-section, moulded inside the flexible screen, with an inner separating strip comprising an integral part of the flexible screen between them, the outer surface of which transitions into symmetrical screen strips, which together with the inner separating strip form guiding grooves open at the bottom, providing space for uninsulated parts of conductor wires, characterised in that the flexible screen is formed as a strip with top and bottom surfaces, which smoothly transition into the screen strips, the outer edges of which touch without being fixed, along the lines parallel to the longitudinal axis of the cable, while longitudinal guiding groove are formed as pockets insulating conductor wires between the screen strips and the conductor wires.

A fixing groove is preferably provided in the top part of the flexible screen, along the longitudinal axis of the cable, the open, outlet edges of the cross-section of which are more narrow than groove edges located deeper in the flexible screen.

The use of a flexible, multi-wire power supply cable with linear power reception according to the invention shall enable quick construction of safe power supply installations for mobile electric receivers, including temporary solutions, for example trolleybuses, and the use of special pantograph trolleys allows the carrier infrastructure to be simplified radically, it is also possible to use significantly higher voltages and three phase electric power. Such opportunities lower the costs and simplify implementation of electromobile transport solutions, as well as implementation of electromobility in strip mines, at large construction sites and transport lines with lower traffic. The novel solution according to the invention is also intended as a power supply source for some inspection systems including suspended or attached drones.

BRIEF DESCRIPTION OF THE SEVERAL VIEWS OF THE DRAWINGS

The subject of the invention is presented in embodiments in the figures, in which.

DESCRIPTION OF SPECIFIC EMBODIMENTS OF THE INVENTION

Figure 1:
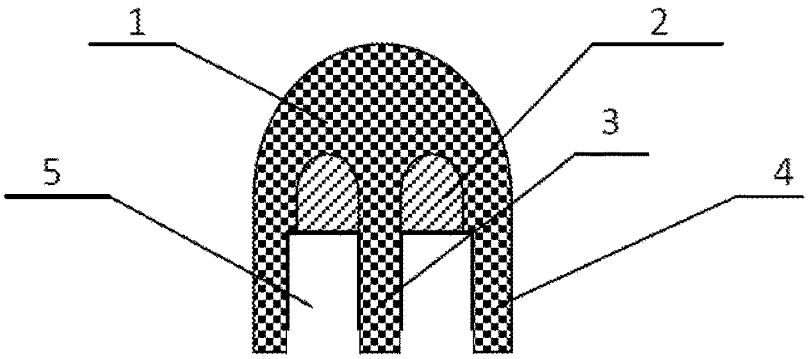
FIG. 1 presents a cross-section through a flexible, multi-wire power supply cable with linear power reception with two conductor wires and guiding grooves open at the bottom.

A flexible, multi-wire power supply cable with linear power reception according to the invention is characterised in that in the flexible screen (1) made of elastomer with properties characterised for electric insulators in which there are partially, namely not along the entire circumference of the cross-section, moulded at least two conductor wire (2) made of electric conductor, preferably of a flexible conductor, for example in the form of a twisted cable made of many wires, preferably wrapped with a conductor tape, between which an inner separating strip (3) comprising an integral part of the flexible screen (1) is located, the outer surface of which transitions into symmetrical screen strips (4), which together with the inner separating strip (3) form guiding grooves (5) open at the bottom, providing a space, inside which the uninsulated parts of the cross-section of conductor wires (2) run, wherein a carrier rope (6) or a carrier strip (7) is moulded inside the flexible screen (1) above the conductor wires (2), made of steel or of other metals or of synthetic or natural fibres, or of a mixture of metal and synthetic fibres, synthetic or other, the separating strips (3) and the screen strips (4) may touch at their outer edges or leave a slit, and additionally, at the bottom surface (9) of the flexible screen (1), along the longitudinal axis of the cable, non-through depressions (10) may be provided in equal or unequal distance from each other, the flexible screen (1) may be provided with a narrowing fixing strip (13) or with a straight fixing strip (14) in its top part, additionally, toothed combs (18) or longitudinal grooves (19) may be provided in the flexible screen, or through openings (16) are provided between the top surface (8) and the bottom surface (9) of the flexible screen (1), in equal or unequal distances from each other, perpendicular to the longitudinal axis of the cable.

EXAMPLES

Example 1

FIG. 1 presents a cross-section through a flexible, multi-wire power supply cable with linear power reception, with two conductor wires (2) and guiding grooves (5) open at the bottom, with a flexible screen (1) made of an elastomer with properties typical for an electric insulator comprising an integral part of the cable. Two conductor wires (2) made of an electrical conductor are partially moulded into the flexible screen (1). An inner separating strip (3) comprising an integral part of the flexible screen (1) is placed between the conductor wires (2), the outer surface of which transitions into symmetrical screen strips (4) which together with the inner separating strip (3) form guiding grooves (5) open at the bottom and providing space, in which uninsulated parts of the cross-section of conductor wires (2) run.

Example 2

Figure 2:
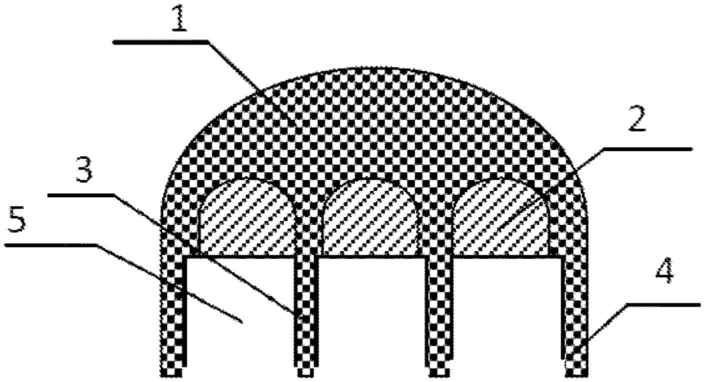
FIG. 2 presents a cross-section through a flexible, multi-wire power supply cable with linear power reception with three conductor wires.

FIG. 2 presents a cross-section through a flexible, multi-wire power supply cable with linear power reception with three conductor wires (2);

Example 3

Figure 3:
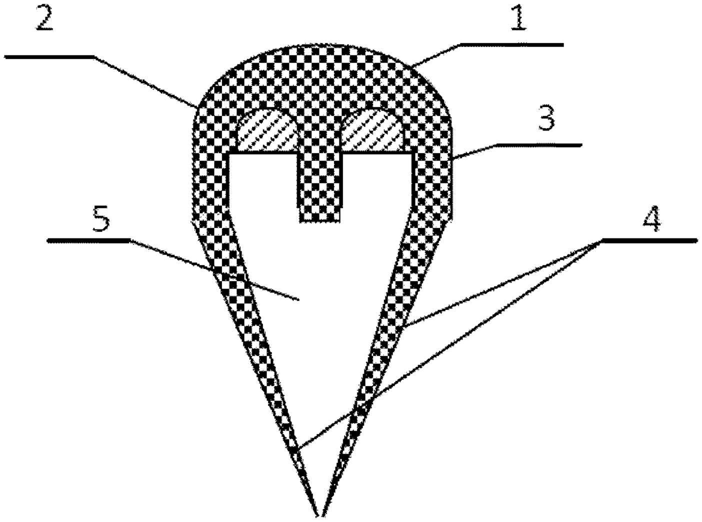
FIG. 3 presents a cross-section through a flexible, multi-wire power supply cable with linear power reception with screen strips touching at their outer edges.

FIG. 3 presents a cross-section through a flexible, multi-wire power supply cable with linear power reception, in which the screen strips (4) are longer than the separating strip (3) and touch at their outer edges, resulting in the guiding grooves (5) forming a pocket, additionally insulating the conductor wires (2) from the environment.

Example 4

Figure 4:
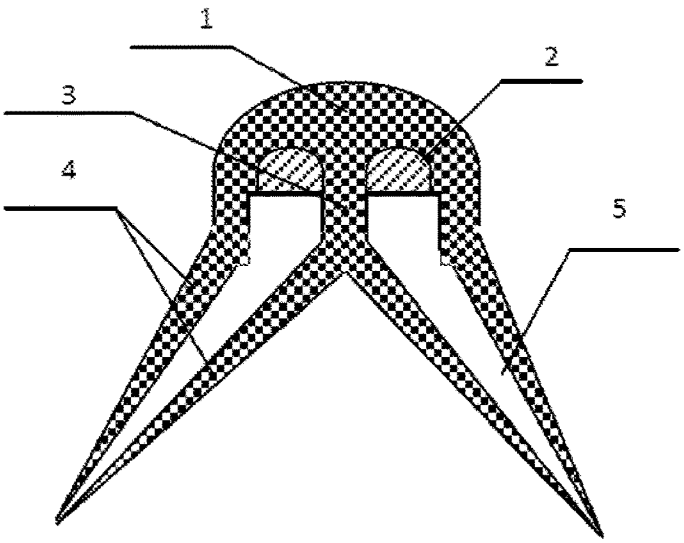
FIG. 4 presents a cross-section through a flexible, multi-wire power supply cable with linear power reception, in which the outer edges of the split inner separating strip and of the screen strips touch each other.

FIG. 4 presents a cross-section through a flexible, multi-wire power supply cable with linear power reception, in which the separating strip (3) is divided along the longitudinal lines into at least two strips touching the outer edges (4) of the screen strips, forming two separate pockets isolating the conductor wires (2) from the environment.

Example 5

Figure 5:
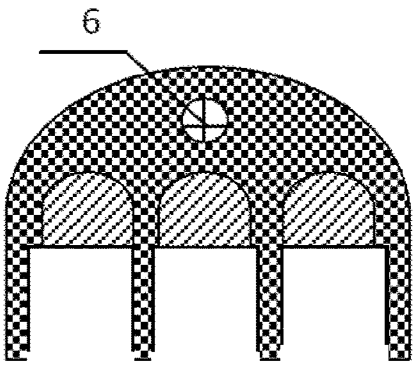
FIG. 5 presents a cross-section through a flexible, multi-wire power supply cable with linear power reception with a carrier rope.

FIG. 5 presents a cross-section through a flexible, multi-wire power supply cable with linear power reception, in which a steel carrier rope (6) is moulded inside the flexible screen (1), above the conductor wires (2). The carrier rope is made of twisted, steel wires forming a structure analogous to a rope twisted from other materials. The carrier rope is intended to relief the wire and to remove their function of carrying and transferring mechanical loads. A steel rope used in conveyor belts with steel ropes may be an example of a steel carrier rope.

Example 6

Figure 6:
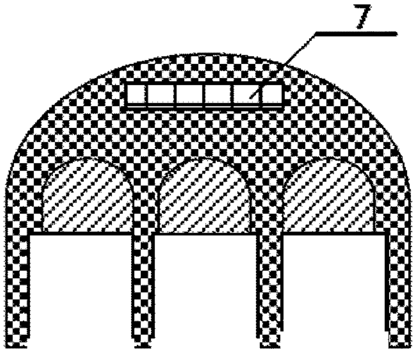
FIG. 6 presents a cross-section through a flexible, multi-wire power supply cable with linear power reception with a carrier strip.

FIG. 6 presents a cross-section through a flexible, multi-wire power supply cable with linear power reception, in which a steel carrier strip (7) is moulded inside the flexible screen (1), above the conductor wires (2). The carrier strip, similar to the carrier rope, relieves the cable from its function of carrying and transferring loads and enables cable optimisation in terms of ensuring its long useful lifetime, good contact and low resistance, it also mitigates microdamage caused by variable, cyclical mechanical loads. The carrier strip may, for example, have the form of a band of parallel, thin steel wires or a steel tape bundle.

Example 7

Figure 7:
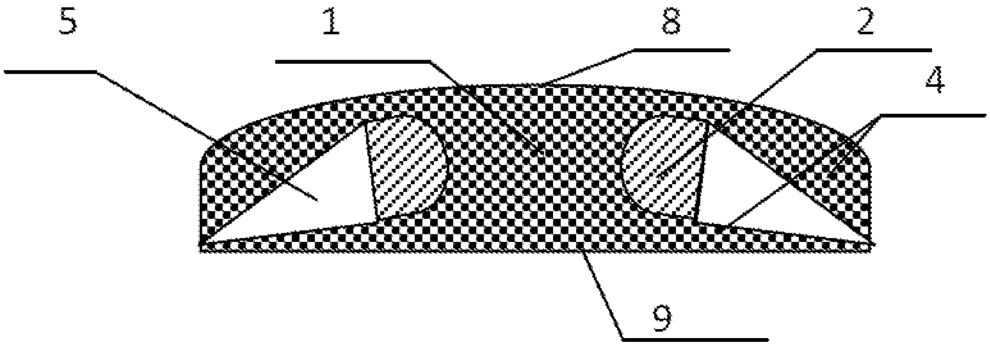
FIG. 7 presents a cross-section through a flexible, multi-wire power supply cable with linear power reception provided in the form of a flat strip with monolithic top and bottom surfaces of the flexible screen and side access to conductor wires in the guiding grooves covered by the screen strips.

FIG. 7 presents a cross-section through a flexible, multi-wire power supply cable with linear power reception, formed as a flat strip with monolithic top (8) and bottom (9) surfaces of the flexible screen (1), which smoothly transition into screen strips (4), the outer edges of which touch, without being fixed, along lines parallel to the longitudinal axis of the cable, forming pockets insulating the conductor wires (2) from the environment.

Example 8

Figure 8:
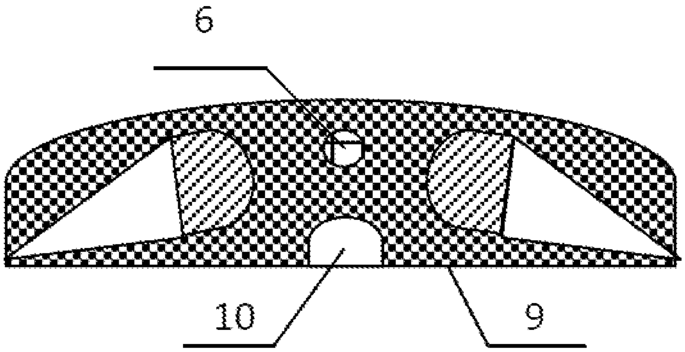
FIG. 8 presents a cross-section through a flexible, multi-wire power supply cable with linear power reception with a carrier rope and with depressions in the bottom screen surface.

FIG. 8 presents a cross-section through a flexible, multi-wire power supply cable with linear power reception, analogous to the one presented in FIG. 7, additionally provided with a carrier rope (6) and a depression (10) in the bottom surface of the screen. The depressions (10) may be used to fix a supporting—adjusting structure, but also as an element cooperating with a carriage driving wheel with geometrical protrusions matching the depressions.

Example 9

Figure 9:
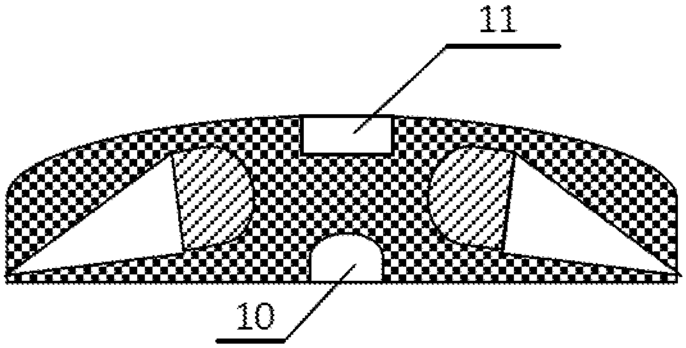
FIG. 9 presents a cross-section through a flexible, multi-wire power supply cable with linear power reception with depressions in the top and the bottom screen surfaces.

FIG. 9 presents a cross-section through a flexible, multi-wire power supply cable with linear power reception, analogous to the one presented in FIG. 7, additionally provided with depressions (10) and (11), respectively, in the bottom and the top surface of the screen. The depressions (10) and (11) may be used, for example, to support the cable at the bottom, if the carriage moves along the top surface of the cable.

Example 10

Figure 10:
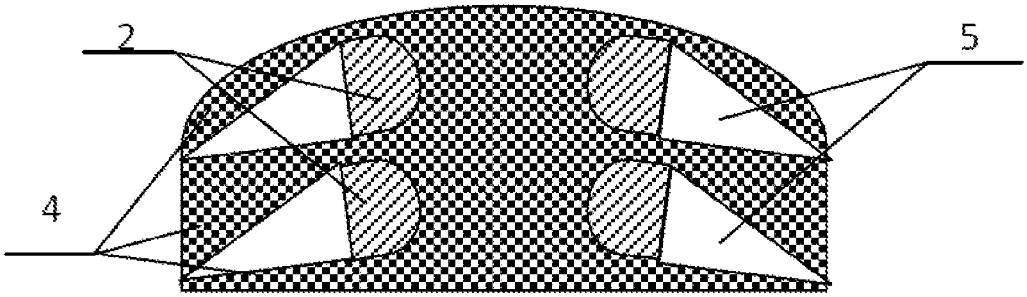
FIG. 10 presents a cross-section through a flexible, multi-wire power supply cable with linear power reception to provide three phase power supply in a four-cable system with doubled configuration of power supply wires and guiding grooves by placing them inside the flexible screen, one over the other.

FIG. 10 presents a cross-section through a flexible, multi-wire power supply cable with linear power reception to provide three phase power supply in a four-cable system with doubled configuration of conductor wires (2) and guiding grooves (4) by placing them inside the flexible screen (1), one over the other.

Example 11

Figure 11:
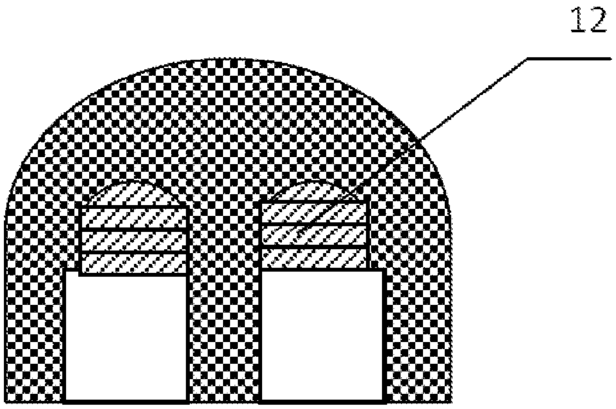
FIG. 11 presents a cross-section through a flexible, multi-wire power supply cable with linear power reception with a bundle conductor wire provided as a conductor tape bundle.

FIG. 11 presents a cross-section through a flexible, multi-wire power supply cable with linear power reception with a bundle conductor wire (12) provided as a conductor tape bundle. The bundle wire is constructed for the same purpose as twisted cables—in order to increase flexibility of the entire structure. This is the design used, for example, with high current flat strips providing power supply e.g. for mobile receivers.

Example 12

Figure 12:
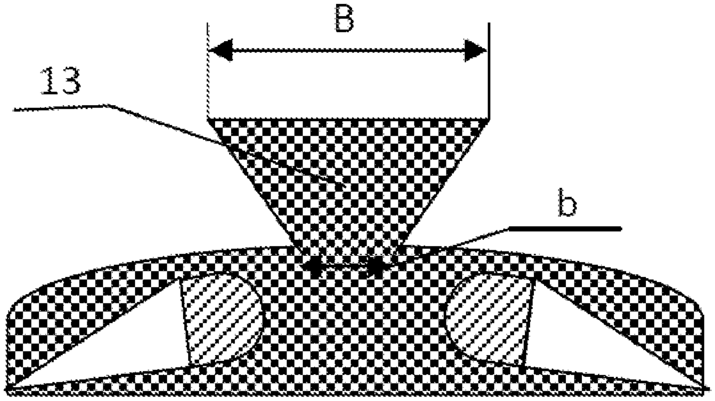
FIG. 12 presents a cross-section through a flexible, multi-wire power supply cable with linear power reception with a narrowing fixing strip protruding from the flexible screen, with a dovetail cross-section.

FIG. 12 presents a cross-section through a flexible, multi-wire power supply cable with linear power reception, in which a fixing strip (13) with a "dovetail" cross-section protrudes upwards from the flexible screen (1), wherein B denotes the maximum width of the fixing strip (13) and b denotes the minimum width of the fixing strip (13). The dovetail is used to attach the cable to supports along the way—the fixing element and the adjustment is a profiled connection—the cable hanger is provided with removable elements with shapes corresponding to the dovetail and sides of such a strip transfer the weight to the hanger.

Example 13

Figure 13:
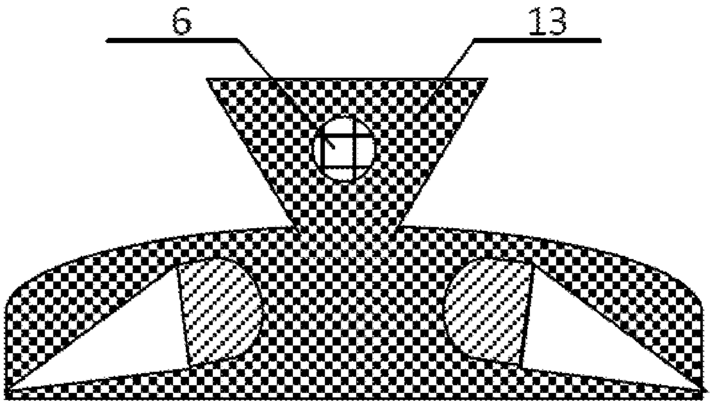
FIG. 13 presents a cross-section through a flexible, multi-wire power supply cable with linear power reception with a narrowing fixing strip provided with a carrier rope.
Figure 14:
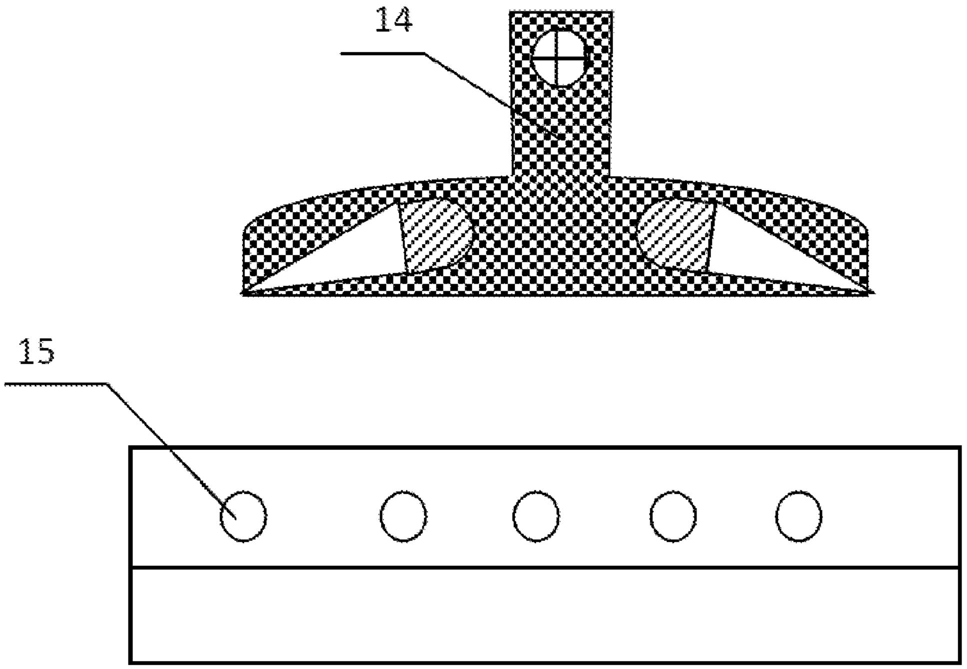
FIG. 14 presents a cross-section through a flexible, multi-wire power supply cable with linear power reception with a straight fixing strip protruding from the flexible screen, with a rectangular cross-section and with transverse openings in the straight fixing strip.

FIG. 13 presents a cross-section through a flexible, multi-wire power supply cable with linear power reception, in which a fixing strip (13) provided with a steel carrier rope (6) protrudes upwards from the flexible screen (1).

Example 14

FIG. 13 presents a cross-section through a flexible, multi-wire power supply cable with linear power reception, in which a fixing strip (14) with a rectangular cross-section, provided with transverse openings along the straight fixing strip (14) protrudes upwards from the flexible screen (1). The rectangular shape of the cross-section of the top strip minimises the cross-section surface area inaccessible to carriage rollers, and perpendicular openings formed in this strip are used for fixing purposes.

Example 15

Figure 15:
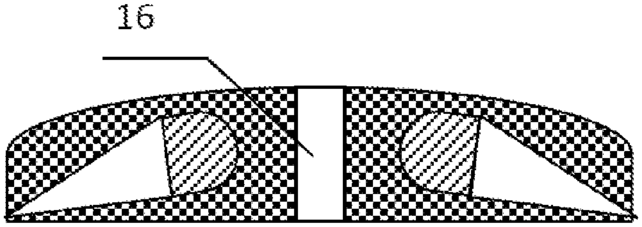
FIG. 15 presents a cross-section through a flexible, multi-wire power supply cable with linear power reception with periodically provided, through openings in the screen, perpendicular to the cable axis.

FIG. 15 presents a cross-section through a flexible, multi-wire power supply cable with linear power reception, in which through openings (16) perpendicular to the cable axis are periodically provided in the flexible screen (1). These openings are used to fix the supporting cable.

Example 16

Figure 16:
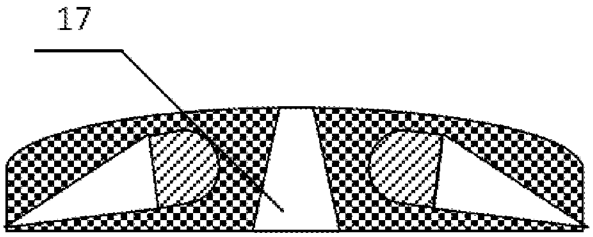
FIG. 16 presents a cross-section through a flexible, multi-wire power supply cable with linear power reception with periodically provided, through openings in the screen, with their cross-section surface area increasing along the axis of the opening.

FIG. 16 presents a cross-section through a flexible, multi-wire power supply cable with linear power reception, in which through openings (17) with cross-section surface area increasing along the axis of the opening (17) are periodically provided in the flexible screen (1). Such openings are used to fix the cable on an external supporting structure, where load transfers and adjustments take place via the conical surface of the nut or of a pad supported, for example, by a screw passed through.

Example 17

Figure 17:
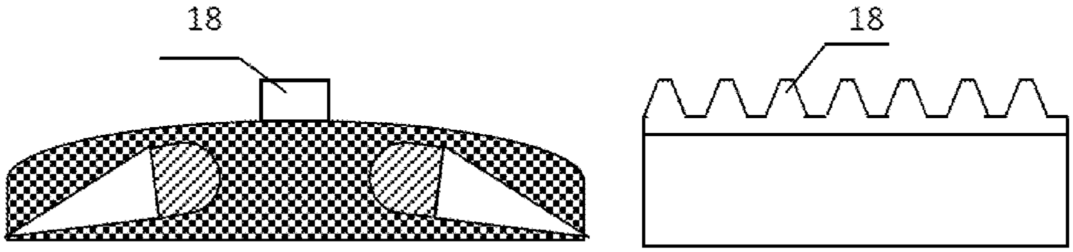
FIG. 17 presents a cross-section through a flexible, multi-wire power supply cable with linear power reception with a toothed comb protruding from the flexible screen.

FIG. 17 presents a cross-section through a flexible, multi-wire power supply cable with linear power reception, in which a toothed comb (18) protrudes upwards from the flexible screen (1). The toothed comb cooperates with the toothed wheel of the carriage drive.

Example 18

Figure 18:
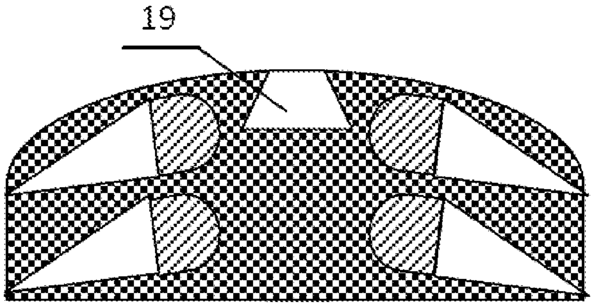
FIG. 18 presents a cross-section through a flexible, multi-wire power supply cable with linear power reception with a longitudinal fixing groove provided in the top surface of the flexible screen.

FIG. 18 presents a cross-section through a flexible, multi-wire power supply cable with linear power reception with a longitudinal fixing groove (19) with trapezoidal shape is provided in the top surface of the flexible screen (1). The trapezoidal cross-section is used to fix hangers as load-transferring elements and may be easily assembled.

What is claimed is:

1. A flexible multi-wire power supply cable with linear current reception, comprising: a flexible screen made of an elastomer with properties typical for an electric insulator and with at least two conductor wires made of electric conductor, preferably a flexible conductor, the conductor wires are partially, that is, at parts of the circumference of the cross-section of the flexible multi-wire power supply cable, moulded inside the flexible screen, with an inner separating strip comprising an integral part of the flexible screen between them, the outer surface of which transitions into symmetrical screen strips, which together with the inner separating strip form guiding grooves open at the bottom of the flexible screen, providing space for uninsulated parts of conductor wires, characterised in that the screen strips have edges of the cross-section of the flexible multi-wire power supply cable that are longer than the height of the separating strip, with said edges are touching without being fixed, along the longitudinal axis of the cable, thus creating a pocket insulating the conductor wires.

2. A flexible multi-wire power supply cable with linear current reception according to claim 1, wherein the flexible electric conductor used to make the conductor wires is in the form of a twisted rope made of many small wires, preferably wrapped inside a conductor tape.

3. A flexible multi-wire power supply cable with linear current reception according to claim 1, characterised in that a carrier rope made of steel or of other metals or of polymer fibres or of a mixture thereof with metals or of natural fibres or of a mixture thereof with polymer fibres is preferably moulded inside the flexible screen, above the conductor wires.

4. A flexible multi-wire power supply cable with linear current reception according to claim 1, characterised in that a carrier strip made of steel tapes or of other metals or of polymer tapes or of a mixture thereof with metal tapes or of natural fibres or of a mixture thereof with polymer fibres is preferably moulded inside the flexible screen, above the conductor wires.

5. A flexible multi-wire power supply cable with linear current reception comprising: a flexible screen made of an elastomer with properties typical for an electric insulator and with at least two conductor wires made of electric conductor, preferably a flexible conductor, the conductor wires are partially, that is, at parts of the circumference of the cross-section of the flexible multi-wire power supply cable, moulded inside the flexible screen, with an inner separating strip comprising an integral part of the flexible screen between them, the outer surface of which transitions into symmetrical screen strips, which together with the inner separating strip form guiding grooves open at the bottom of the flexible screen, providing space for uninsulated parts of conductor wires, characterised in that the flexible screen is formed as a strip with top and bottom surfaces, which smoothly transition into the screen strips, outer edges of which touch without being fixed, along lines parallel to the longitudinal axis of the cable, while longitudinal guiding grooves are formed as pockets insulating conductor wires between the screen strips and the conductor wires.

6. A flexible multi-wire power supply cable with linear current reception according to claim 5, characterised in that non-through depressions are provided in the bottom surface of the flexible screen, along the longitudinal axis of the cable, placed evenly or unevenly, wherein the distance between such depression is preferably in the range between 5 and 300 mm.

7. A flexible multi-wire power supply cable with linear current reception according to claim 5, characterised in that non-through depressions are provided in the top surface of the flexible screen, along the longitudinal axis of the cable, placed evenly or unevenly, wherein the distance between such depression is preferably in the range between 5 and 300 mm.

8. A flexible multi-wire power supply cable with linear current reception according to claim 1, characterised in that the conductor wires are formed as a conductor tape bundle.

9. A flexible multi-wire power supply cable with linear current reception according to claim 1, characterised in that the flexible screen preferably provided in its top part with a fixing strip, the width of the top base B of which is equal to or greater than the width of the bottom base b of the strip.

10. A flexible multi-wire power supply cable with linear current reception according to claim 9, characterised in that a carrier rope made of steel or of other metals or of polymer fibres or of a mixture thereof with metals or of natural fibres or of a mixture thereof with polymer fibres is moulded inside the fixing strip of the flexible screen.

11. A flexible multi-wire power supply cable with linear current reception according to claim 9, characterised in that the flexible screen provided with a fixing strip (13, 14) in its top part, with openings provided in the strip, in surfaces lateral to the longitudinal axis of the cable, with the openings formed as through or non-through openings.

12. A flexible multi-wire power supply cable with linear current reception according to claim 5, characterised in that through openings are provided in the flexible screen, between the top and the bottom surfaces, at equal or different distances from each other.

13. A flexible multi-wire power supply cable with linear current reception according to claim 12, characterised in that the surface area of the cross-section of the through openings is larger on the side of the bottom surface than on the side of the top surface.

14. A flexible multi-wire power supply cable with linear current reception according to claim 5, characterised in that a toothed comb is provided in the top part of the flexible screen, along the longitudinal axis of the cable.

15. A flexible multi-wire power supply cable with linear current reception according to claim 5, characterised in that a fixing groove is provided in the top part of the flexible screen, along the longitudinal axis of the cable, open, outlet edges of the cross-section of which are more narrow than groove edges located deeper in the flexible screen.

16. A flexible multi-wire power supply cable with linear current reception, provided with a flexible screen made of an elastomer with properties typical for an electric insulator and with at least two conductor wires made of electric conductor, preferably a flexible conductor, the conductor wires are partially, that is, at parts of the circumference of the cross-section of the flexible multi-wire power supply cable, moulded inside the flexible screen, with an inner separating strip comprising an integral part of the flexible screen between them, the outer surface of which transitions into symmetrical screen strips, which together with the inner separating strip form guiding grooves open at the bottom of the flexible screen, providing space for uninsulated parts of conductor wires, characterised in that that the separating strip is split along the longitudinal axis into at least two inner screen strips touching at edges of the outer screen strips without being fixed, along the longitudinal axis of the cable, forming two pockets insulating the conductor wires, wherein the outer screen strips swing outwards thus forming outwardly directed pockets to isolate the conductor wires to ensure a side access for the conductor wires.

* * * * *